(12) United States Patent
Yoshida

(10) Patent No.: US 10,175,408 B2
(45) Date of Patent: Jan. 8, 2019

(54) PLANAR ILLUMINATION APPARATUS

(71) Applicant: MINEBEA MITSUMI Inc., Nagano (JP)

(72) Inventor: Takahito Yoshida, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/823,697

(22) Filed: Nov. 28, 2017

(65) Prior Publication Data
US 2018/0156958 A1 Jun. 7, 2018

(30) Foreign Application Priority Data

Dec. 1, 2016 (JP) .................. 2016-234307

(51) Int. Cl.
G09F 13/08 (2006.01)
F21V 8/00 (2006.01)
G02F 1/1335 (2006.01)

(52) U.S. Cl.
CPC ......... *G02B 6/0018* (2013.01); *G02B 6/0055* (2013.01); *G02B 6/0086* (2013.01); *G02F 1/133524* (2013.01); *G02F 1/133603* (2013.01)

(58) Field of Classification Search
USPC ....................................... 362/97.3
See application file for complete search history.

(56) References Cited

U.S. PATENT DOCUMENTS 7,654,692 B2 * 2/2010 Kitamura ................ F21V 21/30
362/239

FOREIGN PATENT DOCUMENTS

JP 2005-108817 A 4/2005
JP 2014-032953 A 2/2014

* cited by examiner

*Primary Examiner* — Jamara Franklin
(74) *Attorney, Agent, or Firm* — Pearne & Gordon LLP

(57) ABSTRACT

A planar illumination apparatus according to an embodiment includes a light guide plate that includes an emission surface that emits light and a reflective surface that is a surface opposite to the emission surface and that reflects light, a light blocking member that defines an effective region of the emission surface, and a light source arranged so as to face a light incident side surface of the light guide plate. In a portion of the effective region beside a light blocking region of the light blocking member, a first reflective surface is provided that includes a region that is inclined in a direction approaching the emission surface side with an increase in a distance from the light incident side surface.

12 Claims, 5 Drawing Sheets

PLANAR ILLUMINATION APPARATUS

CROSS-REFERENCE TO RELATED APPLICATION(S)

The present application claims priority to and incorporates by reference the entire contents of Japanese Patent Application No. 2016-234307 filed in Japan on Dec. 1, 2016.

BACKGROUND OF THE INVENTION

1. Field of the Invention

The present invention relates to a planar illumination apparatus.

2. Description of the Related Art

Conventionally, there is a known planar illumination apparatus, in which a light emitting diode (LED) is arranged so as to face a light incident side surface that is one end surface of a light guide plate and in which a wedge portion to make the apparatus thin is provided on a reflective surface side close to the light incident side surface, where the reflective surface is a back surface of the light guide plate. Furthermore, in the planar illumination apparatus, an effective region to emit light to the outside is defined by a light blocking member that covers a region including the LED and the wedge portion of the light guide plate from an emission surface side, where the emission surface is a front surface of the light guide plate.

Patent Literature 1: Japanese Patent Application Laid-open No. 2005-108817

Patent Literature 2: Japanese Patent Application Laid-open No. 2014-32953

However, in the planar illumination apparatus according to the conventional technology as described above, because the wedge portion is provided on the light guide plate close to the light incident side surface, luminance unevenness may occur on the periphery of the effective region.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
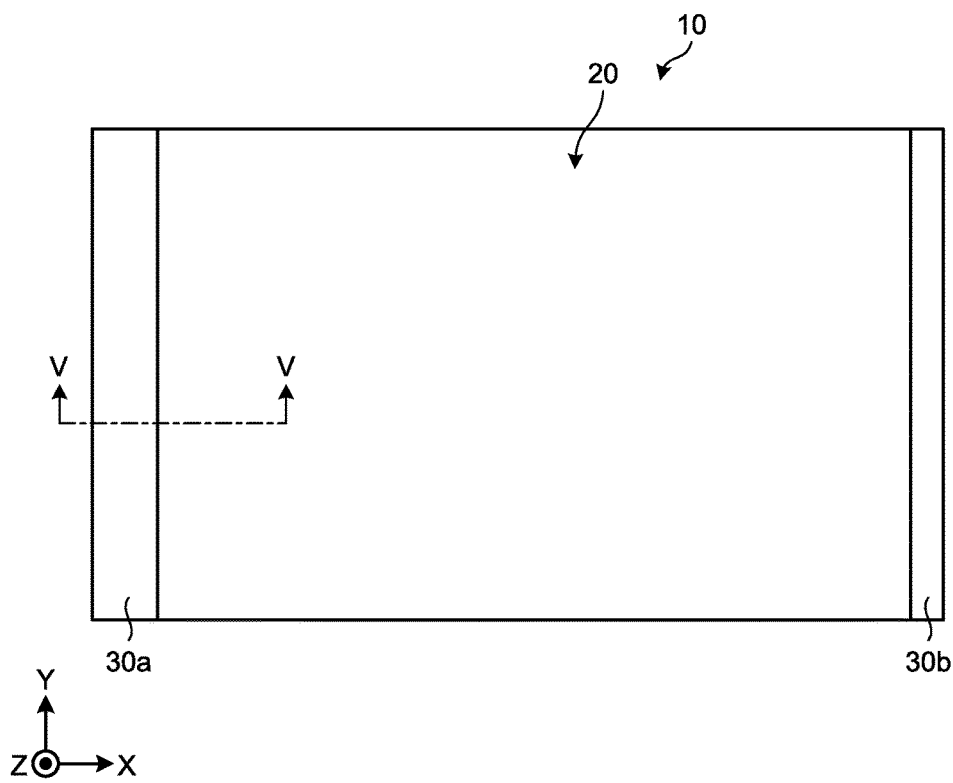
FIG. 1 is a plan view illustrating an example of an appearance of a planar illumination apparatus according to an embodiment.

Embodiments of a planar illumination apparatus will be described below with reference to the drawings. The present invention is not limited by the embodiments below. Furthermore, dimensional relationships among components, ratios among the components, and the like in the drawings may be different from actual ones. Moreover, the dimensional relationships and the ratios of some parts may be different between the drawings.

Figure 2:
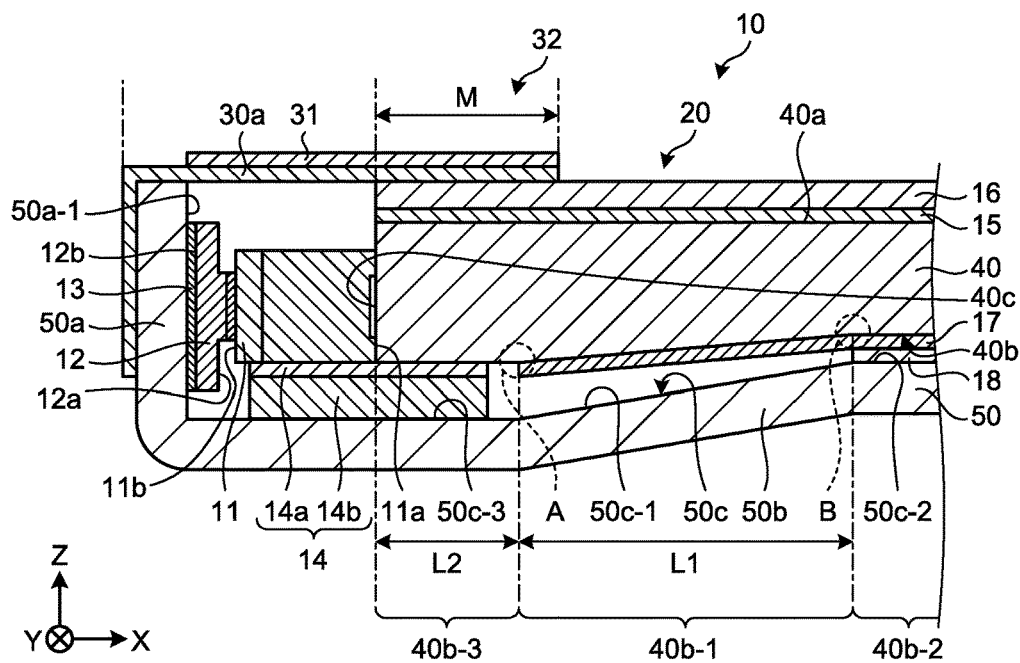
FIG. 2 is a schematic cross-sectional view taken along a line V-V in FIG. 1.

First, with reference to FIG. 1 and FIG. 2, a configuration example of a planar illumination apparatus 10 according to an embodiment will be described. FIG. 1 is a plan view illustrating an example of an appearance of the planar illumination apparatus according to the embodiment. FIG. 2 is a schematic cross-sectional view taken along a line V-V in FIG. 1.

In FIG. 1 and FIG. 2, for simplicity of explanation, a three-dimensional rectangular coordinate system including the Z-axis with the positive direction toward a light emission side surface is illustrated. The rectangular coordinate system may be illustrated in other drawings referred to in the descriptions below.

As illustrated in FIG. 1, the planar illumination apparatus 10 according to the embodiment emits light from an effective region 20 as a region that is not covered by light blocking sheets 30a and 30b. Specifically, in the planar illumination apparatus 10, the effective region 20 of an emission surface 40a of a light guide plate 40 (see FIG. 2) is defined by the light blocking sheets 30a and 30b.

The planar illumination apparatus 10 is used as, for example, a backlight of a liquid crystal display. The liquid crystal display is used in, for example, an information mobile terminal, such as a smartphone or a tablet.

Furthermore, as illustrated in FIG. 1, the light blocking sheet 30a on the negative direction side of the X-axis has a larger sheet width in the X-axis direction than the light blocking sheet 30b on the positive direction side of the X-axis. This is because the light blocking sheet 30a covers a light emitting diode (LED) 11, a flexible printed circuit (FPC) 12 (see FIG. 2), and the like.

In FIG. 1, illustration of a light blocking sheet 31 (see FIG. 2) is omitted. Furthermore, the light blocking sheets 30a, 30b, and 31 are one example of a light blocking member.

As illustrated in FIG. 2, the planar illumination apparatus 10 includes the LED 11, the FPC 12, a fixing member 13, a connecting member 14, a diffusion sheet 15, a prism sheet 16, a reflective sheet 17, the light guide plate 40, and a container (frame) 50.

The container 50 houses the LED 11, the FPC 12, the fixing member 13, the connecting member 14, the diffusion sheet 15, the prism sheet 16, the reflective sheet 17, and the light guide plate 40. The container 50 is, for example, a container made of stainless steel that has large rigidity, and includes a side wall portion 50a and a bottom portion 50b.

The LED 11 is a point-like light source, and is, for example, a pseudo white LED constituted of a blue LED and a yellow phosphor. The LED 11 is formed in an approximately rectangular parallelepiped shape as a whole, and has a pair of principal surfaces 11a and 11b that face each other in the X-axis direction. The one principal surface (light emitting surface) 11a is in contact with a light incident side surface 40c of the light guide plate 40 on the positive direction side of the X-axis.

In the embodiment, a plurality of the LEDs 11 are arranged at equal intervals in the Y-axis direction along the light incident side surface 40c of the light guide plate 40. The plurality of the LEDs 11 do not necessarily have to be arranged at equal intervals, but may be arranged at unequal intervals. The plurality of the LEDs 11 emit light from the light emitting surfaces 11a provided on the positive direction side of the X-axis toward the light incident side surface 40c of the light guide plate 40. The LED 11 is one example of a light source.

The FPC 12 includes a pair of principal surfaces 12a and 12b that face each other in the X-axis direction. The one principal surface 12a is in contact with the other principal surface 11b located on the side opposite to the light emitting surface 11a of the LED 11. On the FPC 12, a circuit for power supply to the LED 11 or the like is provided.

The fixing member 13 fixes the FPC 12 to an inner side surface 50a-1 of the side wall portion 50a of the container 50. The fixing member 13 is, for example, a double-sided tape. One surface of the fixing member 13 is attached to the other principal surface 12b of the FPC 12, and the other surface of the fixing member 13 is attached to the inner side surface 50a-1.

The light guide plate 40 guides light coming from the LED 11 such that the light is emitted in a planar manner, and includes a translucent material, such as polycarbonate resin or acrylic resin. The light guide plate 40 includes a pair of principal surfaces 40a and 40b that face each other in the Z-axis direction, the light incident side surface (light incident surface) 40c that is a side surface on the side where the LED 11 is arranged, and an opposing surface (not illustrated) that faces the light incident side surface 40c. Light emitted by the LED 11 is incident on the light incident side surface 40c.

Furthermore, of the two principal surfaces 40a and 40b, the one principal surface 40a on the positive direction side of the Z-axis serves as an emission surface (a light emitting surface) from which the light that has entered from the light incident side surface 40c (the light emitted by the LED 11) is emitted. Moreover, the other principal surface 40b on the negative direction side of the Z-axis serves as a reflective surface at which the light that has entered into the light guide plate 40 is reflected.

In the embodiment, for example, an optical path change pattern constituted of a plurality of dots is provided on the one principal surface (the emission surface) 40a, and a traveling direction of light traveling inside the light guide plate 40 is changed by the optical path change pattern such that the light is emitted from the one principal surface 40a. In the following descriptions, the "one principal surface 40a" is described as the "emission surface 40a", and the "other principal surface 40b" is described as the "reflective surface 40b". Furthermore, the emission surface 40a in the embodiment is an overall flat surface that does not include an inclined surface like a first reflective surface 40a-1 as will be described later; however, the present invention is not limited to this example.

The diffusion sheet 15 is arranged so as to cover the emission surface 40a of the light guide plate 40, and diffuses light emitted from the emission surface 40a. The prism sheet 16 is arranged on the side opposite to the light guide plate 40 with respect to the diffusion sheet 15, controls distribution of the light diffused by the diffusion sheet 15, and emits the distribution-controlled light.

The light blocking sheet 30a is arranged so as to cover a part of the prism sheet 16 on the light incident side surface 40c side, the LED 11, the FPC 12, and the fixing member 13. The light blocking sheet 30a blocks light emitted from a partial region of the emission surface 40a of the light guide plate 40, to thereby define the effective region 20 that is a region in which light is emitted from the planar illumination apparatus 10.

Furthermore, a region (a light blocking region) 32 in which light emitted from the emission surface 40a is blocked by the light blocking sheet 30a is provided from the light incident side surface 40c to a predetermined position in the positive direction side of the X-axis. In FIG. 2, a length of the light blocking region 32 is denoted by M. Furthermore, a width of the light blocking region 32 in the X-axis direction is considerably smaller than a width of the effective region 20 in the X-axis direction.

The light blocking sheet 30a is a single-sided tape capable of blocking light, and a portion folded in the negative direction side of the Z-axis is attached to an outer surface of the side wall portion 50a of the container 50. Furthermore, a portion of the light blocking sheet 30a corresponding to the light blocking region 32 is attached to a portion of the prism sheet 16 on the light incident side surface 40c side.

The light blocking sheet 31 is a double-sided tape capable of blocking light. Of a pair of surfaces of the light blocking sheet 31 that face each other in the Z-axis direction, the one surface on the positive direction side of the Z-axis is attached to a liquid crystal display that uses the planar illumination apparatus 10 as a backlight. Furthermore, the other surface on the negative direction side of the Z-axis is attached to the light blocking sheet 30a that covers a part of the prism sheet 16 on the light incident side surface 40c side, the LED 11, the FPC 12, and the fixing member 13.

A conventional planar illumination apparatus will be described below. In the conventional planar illumination apparatus, a wedge portion to make the apparatus thin is provided on a reflective surface side of a light guide plate close to a light incident side surface, and a light blocking sheet that convers a region including an LED, the wedge portion of the light guide plate, and the like defines an effective region of an emission surface of the light guide plate.

However, in the conventional planar illumination apparatus, because the wedge portion is provided on the reflective surface side of the light guide plate close to the light incident side surface, a part of light that has entered from the light incident side surface into the light guide plate is reflected by a steep inclined surface of the wedge portion, so that luminance unevenness occurs on the periphery of the effective region.

To cope with this, as illustrated in FIG. 2, in the planar illumination apparatus 10 according to the embodiment, the reflective surface 40b of the light guide plate 40 includes a first reflective surface 40b-1 including a region that is inclined in a direction approaching the emission surface 40a side with an increase in a distance from the light incident side surface 40c, in a portion of the effective region 20 beside the light blocking region of the light blocking sheet 30a. That is, the reflective surface 40b of the light guide plate 40 includes the first reflective surface 40b-1 that has a front end portion (on the effective region 20 side) extending toward a front side (the effective region 20) and that is inclined in a direction approaching the emission surface 40*a* side with an increase in the distance from the light incident side surface 40*c*.

With this configuration, the planar illumination apparatus 10 according to the embodiment can prevent luminance unevenness on the periphery of the effective region 20.

With reference to FIG. 2, the reflective surface 40*b* of the light guide plate 40 included in the planar illumination apparatus 10 according to the embodiment will be described in detail below.

As illustrated in FIG. 2, the reflective surface 40*b* of the light guide plate 40 includes the first reflective surface 40*b*-1, a second reflective surface 40*b*-2, and a third reflective surface 40*b*-3.

The first reflective surface 40*b*-1 is inclined toward the emission surface 40*a* side from the light blocking region 32 of the light blocking sheet 30*a* to the effective region 20. Specifically, one end portion of the first reflective surface 40*b*-1 in the light blocking region 32 is positioned in the light blocking region 32 at a position near the effective region 20, and another end portion of the first reflective surface 40*b*-1 in the effective region 20 is positioned in the effective region 20 at a position near the light blocking region 32. In FIG. 2, a length from the end portion of the first reflective surface 40*b*-1 on the light blocking region 32 side to the end portion of the first reflective surface 40*b*-1 on the effective region 20 side is denoted by L1.

The first reflective surface 40*b*-1 is inclined toward the emission surface 40*a* side from the light blocking region 32 of the light blocking sheet 30*a* to the effective region 20, so that it is possible to prevent leakage of light from the light guide plate 40 and make the light guide plate 40 thin.

The second reflective surface 40*b*-2 extends from the end portion of the first reflective surface 40*b*-1 on the effective region 20 side in a direction along the emission surface 40*a*. Specifically, the second reflective surface 40*b*-2 extends from the end portion of the first reflective surface 40*b*-1 on the effective region 20 side to an opposing side surface that faces the light incident side surface 40*c*, in a manner parallel to the emission surface 40*a*.

The second reflective surface 40*b*-2 extends from the end portion of the first reflective surface 40*b*-1 on the effective region 20 side to the opposing side surface in a manner parallel to the emission surface 40*a*, so that it is possible to make the light guide plate 40 thin over to the opposing side surface.

The third reflective surface 40*b*-3 extends from the end portion of the first reflective surface 40*b*-1 on the light blocking region 32 side in a direction along the emission surface 40*a*. Specifically, the third reflective surface 40*b*-3 extends from the end portion of the first reflective surface 40*b*-1 on the light blocking region 32 side to the light incident side surface 40*c* in a manner parallel to the emission surface 40*a*. In FIG. 2, a length of the third reflective surface 40*b*-3 in the X-axis direction is denoted by L2.

The third reflective surface 40*b*-3 extends from the end portion of the first reflective surface 40*b*-1 on the light blocking region 32 side to the light incident side surface 40*c* in a manner parallel to the emission surface 40*a*, so that it is possible to obtain a large area to which the connecting member 14 adheres.

The third reflective surface 40*b*-3 does not necessarily have to be parallel to the emission surface 40*a*, but may be inclined toward the emission surface 40*a* side from the light incident side surface 40*c* to the end portion of the first reflective surface 40*b*-1 on the light blocking region 32 side.

In this case, the inclination of the third reflective surface 40*b*-3 is more moderate than the inclination of the first reflective surface 40*b*-1.

Furthermore, the third reflective surface 40*b*-3 may be provided so as to extend to the effective region 20. In this case, the first reflective surface 40*b*-1 is provided so as to be located within the effective region 20.

Moreover, while the optical path change pattern (a first optical path change pattern) is provided on the emission surface 40*a* in the above-described light guide plate 40, it is preferable to provide a second optical path change pattern on the third reflective surface 40*b*-3 of the reflective surface 40*b*. The reason for this will be described below.

First, when the optical path change pattern is provided on only the emission surface 40*a* of the light guide plate 40, a problem as described below may occur. Specifically, among light that has entered from the light incident side surface 40*c* into the light guide plate 40, light that has entered into the light blocking region 32 of the emission surface 40*a* is incident on the optical path change pattern, so that an optical path is changed. However, this light is not incident on the effective region 20 of the emission surface 40*a* and is not emitted to the outside from the incident position before the light is reflected by the first reflective surface 40*b*-1 once while the light travels forward. Therefore, if the length M of the light blocking region 32 is reduced because of the demand for what is called a slim bezel, a region in which light is not emitted (a dark area) is provided in a portion of the effective region 20 on the light blocking region 32 side.

In contrast, if the second optical path change pattern is additionally provided on the third reflective surface 40*b*-3, an optical path of light that has directly entered from the light incident side surface 40*c* to the third reflective surface 40*b*-3 is changed by the second optical path change pattern, and the light is emitted from a portion of the effective region 20 on the light blocking region 32 side. Therefore, even when implementation of a slim bezel is accelerated, it is possible to prevent an occurrence of the dark area in the above-described portion.

Furthermore, it may be possible to provide optical path change patterns on the first reflective surface 40*b*-1 and the second reflective surface 40*b*-2 in the reflective surface 40*b* of the light guide plate 40 if needed, in addition to the optical path change pattern provided on the third reflective surface 40*b*-3.

Moreover, for example, it may be possible to extend the third reflective surface 40*b*-3 to the effective region 20 and provide the second optical path change pattern on only the third reflective surface 40*b*-3 in the reflective surface 40*b* of the light guide plate 40. In the light guide plate 40 configured as described above, it is possible to improve the light controllability and stably obtain illumination light with excellent uniformity, as compared to a case in which the second optical path change pattern is additionally provided on the first reflective surface 40*b*-1 that is an inclined surface.

Figure 3A:
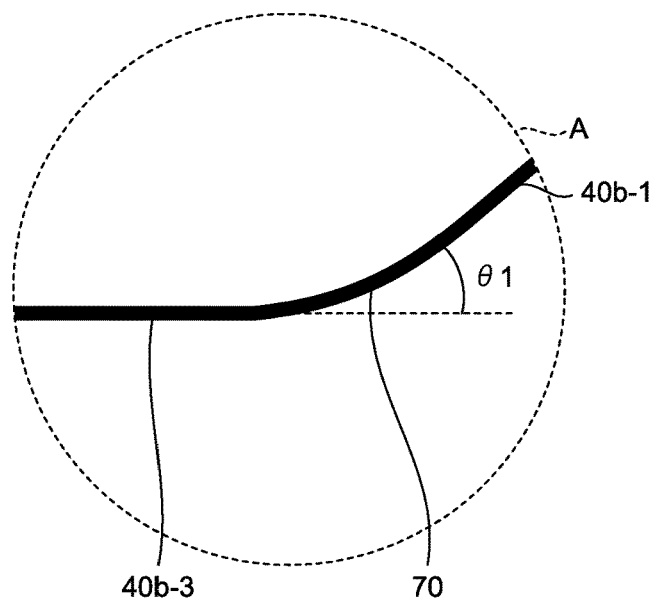
FIG. 3A is an enlarged view of a portion A in FIG. 2.

Next, with reference to FIG. 3A and FIG. 3B, a border portion between the third reflective surface 40*b*-3 and the first reflective surface 40*b*-1, and a border portion between the first reflective surface 40*b*-1 and the second reflective surface 40*b*-2 will be described. FIG. 3A is an enlarged view of a portion A in FIG. 2, and FIG. 3B is an enlarged view of a portion B in FIG. 2.

As illustrated in FIG. 3A, a border portion 70 between the third reflective surface 40*b*-3 and the first reflective surface 40*b*-1 in the reflective surface 40*b* of the light guide plate 40 according to the embodiment is formed in an R-shape. As illustrated in FIG. 3A, the border portion 70 is a portion to connect the third reflective surface 40b-3 that is a flat surface and the first reflective surface 40b-1 that is a flat surface.

That is, the border portion 70 is a surface continuing from the third reflective surface 40b-3 to the first reflective surface 40b-1 while being smoothly curved toward the positive direction of the Z-axis (see FIG. 2). θ1 is an inclination angle of the first reflective surface 40b-1 with respect to the third reflective surface 40b-3.

Figure 3B:
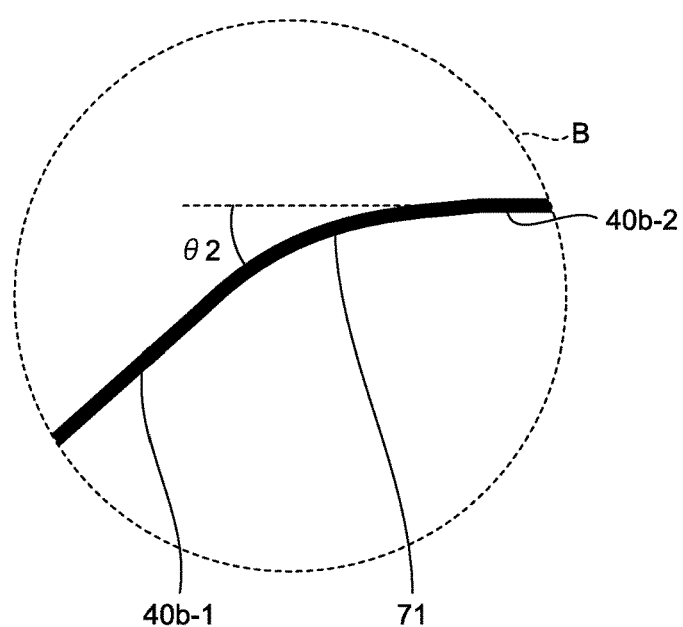
FIG. 3B is an enlarged view of a portion B in FIG. 2.

Furthermore, as illustrated in FIG. 3B, a border portion 71 between the first reflective surface 40b-1 and the second reflective surface 40b-2 in the reflective surface 40b of the light guide plate 40 according to the embodiment is formed in an R-shape. As illustrated in FIG. 3B, the border portion 71 is a portion to connect the first reflective surface 40b-1 that is a flat surface and the second reflective surface 40b-2 that is a flat surface.

That is, the border portion 71 is a surface continuing from the first reflective surface 40b-1 to the second reflective surface 40b-2 while being smoothly curved toward the positive direction of the X-axis (see FIG. 2). θ2 is an inclination angle of the first reflective surface 40b-1 with respect to the second reflective surface 40b-2.

The inclination angle θ1 and the inclination angle θ2 are determined based on the length L1 from the end portion of the first reflective surface 40b-1 on the light blocking region 32 side to the end portion of the first reflective surface 40b-1 on the effective region 20 side and based on the length L2 of the third reflective surface 40b-3. The inclination angle θ1 and the inclination angle θ2 are alternate angles, so that θ1 is equal to θ2. It may be possible to increase one of θ1 and θ2 relative to the other one of θ1 and θ2.

Referring back to FIG. 2, the container 50 will be described below. The bottom portion 50b of the container 50 includes a bottom surface 50c. The bottom surface 50c includes a first bottom surface 50c-1, a second bottom surface 50c-2, and a third bottom surface 50c-3.

The first bottom surface 50c-1 is a portion corresponding to the first reflective surface 40b-1. The first bottom surface 50c-1 is inclined toward the emission surface 40a side from the light blocking region 32 of the light blocking sheet 30a to the effective region 20. The second bottom surface 50c-2 is a portion corresponding to the second reflective surface 40b-2. The second bottom surface 50c-2 extends parallel to the emission surface 40a. The third bottom surface 50c-3 is a portion corresponding to the third reflective surface 40b-3, the LED 11, the FPC 12, and the fixing member 13. The third bottom surface 50c-3 extends parallel to the emission surface 40a.

The reflective sheet 17 reflects light leaked from the reflective surface 40b of the light guide plate 40, and returns the light to the light guide plate 40 again. The reflective sheet 17 is arranged on the first reflective surface 40b-1 and the second reflective surface 40b-2 along the first reflective surface 40b-1 and the second reflective surface 40b-2. Furthermore, the reflective sheet 17 is arranged between the reflective surface 40b of the light guide plate 40 and the bottom surface 50c while being fixed on the second bottom surface 50c-2 with a double-sided tape 18.

The connecting member 14 is arranged between the third reflective surface 40b-3 of the light guide plate 40, the LED 11, and the third bottom surface 50c-3 of the container 50, and optically and structurally connects the light guide plate 40 and the LED 11. Specifically, the connecting member 14 connects the light incident side surface 40c of the light guide plate 40 and the light emitting surface 11a of the LED 11. Furthermore, the connecting member 14 is arranged so as to continuously cover the third reflective surface 40b-3 of the light guide plate 40 and a surface of the LED 11 on the negative direction side of the Z-axis (the surface opposite to the emission surface 40a). The connecting member 14 is, for example, a strip-shaped single-sided tape and includes an adhesive layer (an adhesive agent) 14a and a base 14b.

The base 14b is, for example, polyethylene terephthalate (PET), and the adhesive layer 14a is, for example, silicon or acrylic. The adhesive layer 14a adheres to the third reflective surface 40b-3 of the light guide plate 40 close to the first reflective surface 40b-1 and adheres to the surface of the LED 11 on the negative direction side of the Z-axis close to the other principal surface 11b.

With this configuration, the third reflective surface 40b-3 of the light guide plate 40 and the surface of the LED 11 on the negative direction side of the Z-axis are attached to the connecting member 14. Consequently, the connecting member 14 connects the light incident side surface 40c of the light guide plate 40 and the light emitting surface 11a of the LED 11.

Figure 4:
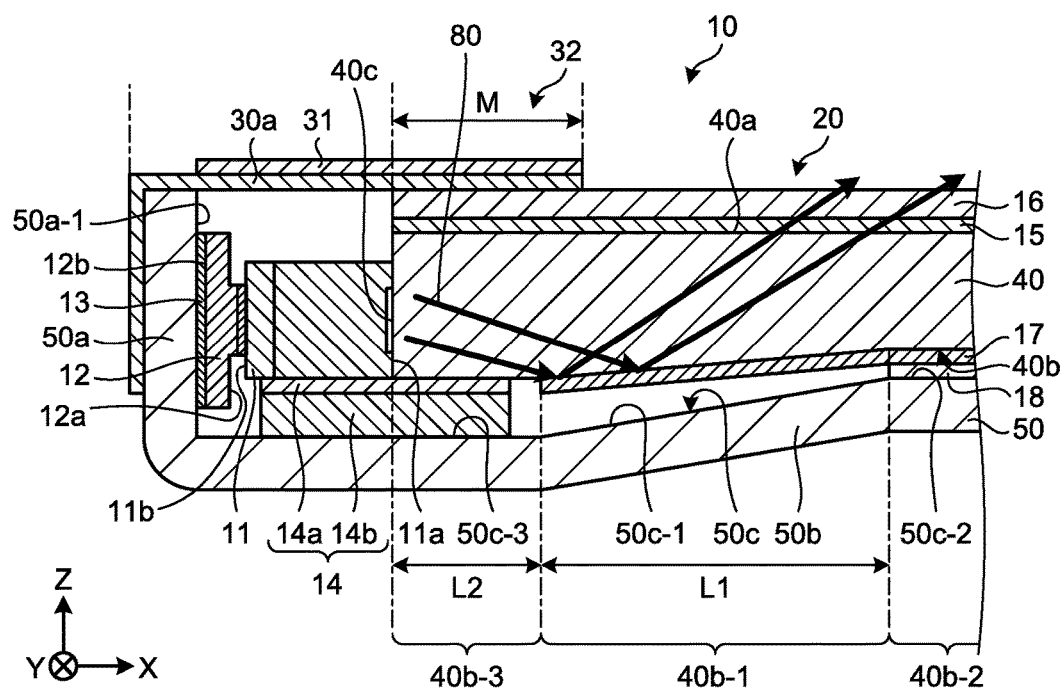
FIG. 4 is a diagram for explaining an optical path in a light guide plate.

Next, with reference to FIG. 4, a path of light that has entered from the light incident side surface 40c into the light guide plate 40 will be described. FIG. 4 is a diagram for explaining an optical path in the light guide plate 40. Components having the same functions as those of the components illustrated in FIG. 2 are denoted by the same signs as illustrated in FIG. 2, and explanation thereof will be omitted.

As illustrated in FIG. 4, among light that has entered from the light incident side surface 40c into the light guide plate 40, light 80 traveling toward the first reflective surface 40b-1 takes an optical path as indicated by solid arrows. Specifically, because the first reflective surface 40b-1 is moderately inclined toward the emission surface 40a side from the light blocking region 32 of the light blocking sheet 30a to the effective region 20, the light 80 that reaches the first reflective surface 40b-1 is reflected toward the center of the effective region 20 due to the moderate inclination.

In contrast, as for the conventional planar illumination apparatus, in the light guide plate including the wedge portion that is provided on the reflective surface side close to the light incident side surface and that is covered by the light blocking sheet, when light traveling toward the inclined surface of the wedge portion among light that has entered from the light incident side surface into the light guide plate reaches the inclined surface of the wedge portion, the light is reflected toward the periphery of the effective region due to the steep inclination.

That is, in the embodiment, when the light that has entered from the light incident side surface 40c into the light guide plate 40 hits the first reflective surface 40b-1, a reflection direction of the light is toward the center of the effective region 20 rather than the periphery of the effective region 20 because the first reflective surface 40b-1 is inclined toward the emission surface 40a side from the light blocking region 32 to the effective region 20.

With this configuration, the planar illumination apparatus 10 according to the embodiment as described above can prevent luminance unevenness on the periphery of the effective region 20. Furthermore, the planar illumination apparatus 10 according to the embodiment as described above can reduce the thickness of the light guide plate 40 in a portion corresponding to the effective region 20 because the reflective surface 40b of the light guide plate 40 is inclined toward the emission surface 40a side from the light blocking region 32 of the light blocking sheet 30a to the effective region 20.

Moreover, as described above, in the planar illumination apparatus 10 according to the embodiment, the light guide plate 40 includes the second reflective surface 40b-2 that extends from the end portion of the first reflective surface 40b-1 on the effective region 20 side in a direction along the emission surface 40a, and the border portion 71 between the first reflective surface 40b-1 and the second reflective surface 40b-2 is formed in an R-shape.

Therefore, the planar illumination apparatus 10 according to the embodiment as described above can prevent diffuse reflection of light at the border portion 71 between the first reflective surface 40b-1 and the second reflective surface 40b-2 in the effective region 20, so that it is possible to prevent diffuse reflection of light inside the effective region 20.

Furthermore, as described above, in the planar illumination apparatus 10 according to the embodiment, the light guide plate 40 includes the third reflective surface 40b-3 that extends from the end portion of the first reflective surface 40b-1 on the light blocking region 32 side in a direction along the emission surface 40a, and the border portion 70 between the third reflective surface 40b-3 and the first reflective surface 40b-1 is formed in an R-shape.

Therefore, the planar illumination apparatus 10 according to the embodiment as described above can prevent diffuse reflection of light at the border portion 70 between the third reflective surface 40b-3 and the first reflective surface 40b-1 in the light blocking region 32, so that it is possible to prevent diffuse reflection of light inside the light blocking region 32.

In the planar illumination apparatus 10 according to the embodiment as described above, the border portion 70 between the third reflective surface 40b-3 and the first reflective surface 40b-1 and the border portion 71 between the first reflective surface 40b-1 and the second reflective surface 40b-2 are formed in R-shapes; however, the present invention is not limited to this mode. As another mode, the border portion 70 and the border portion 71 may not be formed in R-shapes.

Furthermore, as still another mode, the border portion 70 may not be formed in an R-shape and the border portion 71 may be formed in an R-shape. In this mode, it is possible to prevent diffuse reflection at least inside the effective region 20.

Moreover, as described above, in the planar illumination apparatus 10 according to the embodiment, the third reflective surface 40b-3 of the light guide plate 40 is connected to the LED 11 by the connecting member 14 from the side opposite to the emission surface 40a.

With this configuration, in the planar illumination apparatus 10 according to the embodiment, a large adhesive area of the connecting member 14 for connecting the LED 11 can be obtained because of the third reflective surface 40b-3 of the light guide plate 40, so that it is possible to prevent the light guide plate 40 from coming off from the LED 11.

Furthermore, as described above, in the planar illumination apparatus 10 according to the embodiment, the bottom surface 50c of the container 50 includes the first bottom surface 50c-1 that is a portion corresponding to the first reflective surface 40b-1 and that is inclined toward the emission surface 40a side.

With this configuration, the planar illumination apparatus 10 according to the embodiment as described above can reduce the thickness of the apparatus in a portion corresponding to the effective region 20.

Figure 5A:
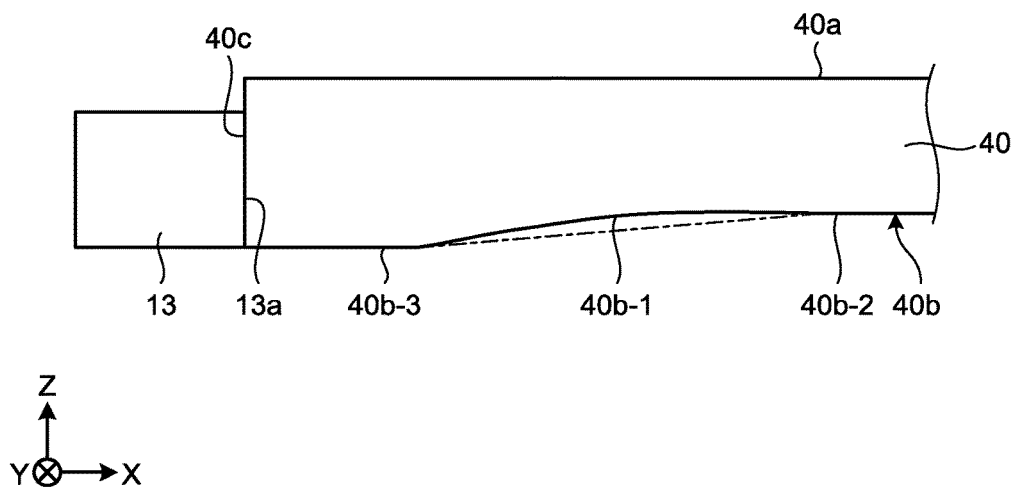
FIG. 5A is a schematic cross-sectional view of a light guide plate according to a first modification of the embodiment.
Figure 5B:
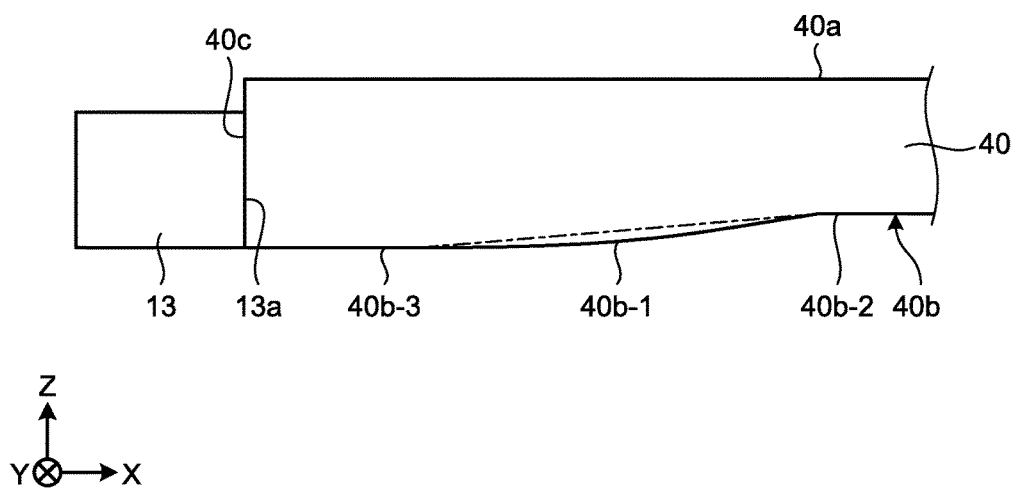
FIG. 5B is a schematic cross-sectional view of a light guide plate according to a second modification of the embodiment.

Next, with reference to FIG. 5A and FIG. 5B, modifications of the light guide plate 40 will be described. FIG. 5A is a schematic cross-sectional view of the light guide plate 40 according to a first modification of the embodiment. FIG. 5B is a schematic cross-sectional view of the light guide plate 40 according to a second modification of the embodiment. Components having the same functions as those of the components illustrated in FIG. 2 are denoted by the same signs as illustrated in FIG. 2, and explanation thereof will be omitted.

As illustrated in FIG. 5A, in the light guide plate 40 according to the first modification, the first reflective surface 40b-1 is inclined in a convex shape with respect to the emission surface 40a side. Specifically, the first reflective surface 40b-1 is moderately curved toward the positive direction of the Z-axis from the end portion of the first reflective surface 40b-1 on the light blocking region 32 side to the end portion of the first reflective surface 40b-1 on the effective region 20 side. In FIG. 5A, a flat inclined surface is indicated by a chain line.

Furthermore, as illustrated in FIG. 5B, in the light guide plate 40 according to the second modification, the first reflective surface 40b-1 is inclined in a concave shape with respect to the emission surface 40a side. Specifically, the first reflective surface 40b-1 is moderately curved toward the negative direction of the Z-axis from the end portion of the first reflective surface 40b-1 on the light blocking region 32 side to the end portion of the first reflective surface 40b-1 on the effective region 20 side. In FIG. 5B, a flat inclined surface is indicated by a chain line.

As described above, in the planar illumination apparatus 10 according to the embodiment, the first reflective surface 40b-1 is inclined in a convex shape or a concave shape with respect to the emission surface 40a; therefore, even when the first reflective surface 40b-1 is not a flat surface, it is possible to achieve the same effect as in the case where the first reflective surface 40b-1 is a flat surface.

Figure 6:
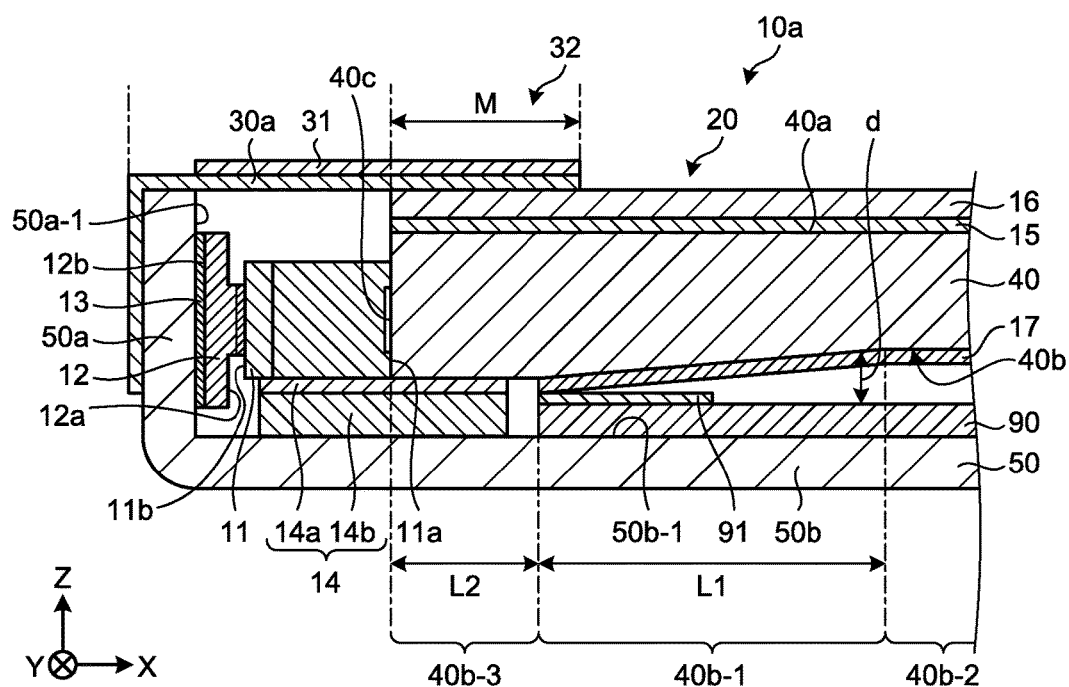
FIG. 6 is a schematic cross-sectional view of a planar illumination apparatus according to a third modification of the embodiment.

Next, with reference to FIG. 6, a planar illumination apparatus 10a according to a third modification of the embodiment will be described. FIG. 6 is a schematic cross-sectional view of the planar illumination apparatus 10a according to the third modification of the embodiment. Components having the same functions as those of the components illustrated in FIG. 2 are denoted by the same signs as illustrated in FIG. 2, and explanation thereof will be omitted.

As illustrated in FIG. 6, the planar illumination apparatus 10a according to the third modification of the embodiment includes the container 50 including a bottom surface 50b-1 oriented along the emission surface 40a, and a touch sensor 90 that is arranged on the bottom surface 50b-1 except for a portion corresponding to the connecting member 14 and that detects a change in capacitance due to a touch operation performed by a user.

Furthermore, the planar illumination apparatus 10a includes a shim tape (registered trademark) 91 that is arranged on a surface of the touch sensor 90 on the emission surface 40a side and that prevents a contact between the light guide plate 40 and the touch sensor 90. The shim tape 91 is arranged in a portion of the touch sensor 90 corresponding to the first reflective surface 40b-1. The shim tape 91 is one example of a buffer member.

Moreover, in the planar illumination apparatus 10a, a distance d between the shim tape 91 and the light guide plate 40 is increased from the light blocking region 32 side to the effective region 20 side. As for a base end of the shim tape 91 on the light blocking region 32 side, one face on the positive direction side of the Z-axis is attached to the reflective sheet 17.

Furthermore, in the planar illumination apparatus 10a, the shim tape 91 is arranged on the portion of the touch sensor 90 corresponding to the first reflective surface 40b-1 because when a portion of the effective region 20 is pressed from the emission surface 40a side, the first reflective surface 40b-1 of the light guide plate 40 may come into contact with the touch sensor 90.

In the planar illumination apparatus 10a according to the third modification of the embodiment as described above, it is sufficient to arrange the shim tape 91 on the portion of the touch sensor 90 corresponding to the first reflective surface 40b-1; therefore, as compared to a case in which the shim tape 91 is arranged over the entire surface of the touch sensor 90, it is possible to reduce a material cost for the shim tape 91.

Furthermore, even in the planar illumination apparatus 10a, the light guide plate 40 includes the first reflective surface 40b-1 that is inclined toward the emission surface 40a side from the light blocking region 32 of the light blocking sheet 30a to the effective region 20; therefore, it is possible to prevent luminance unevenness on the periphery of the effective region 20.

According to an embodiment of the present invention, it is possible to prevent luminance unevenness on the periphery of the effective region.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
   a light guide plate that includes an emission surface that emits light, and a reflective surface that is a surface opposite to the emission surface and that reflects light;
   a light blocking member that defines an effective region of the emission surface; and
   a light source arranged so as to face a light incident side surface of the light guide plate, wherein
   the reflective surface includes, in a portion of the effective region beside a light blocking region of the light blocking member, a first reflective surface including a region that is inclined in a direction approaching the emission surface side with an increase in a distance from the light incident side surface.

2. The planar illumination apparatus according to claim 1, wherein the first reflective surface is inclined in one of a convex shape and a concave shape with respect to the emission surface side.

3. The planar illumination apparatus according to claim 1, wherein
   the reflective surface includes a second reflective surface that extends from an end portion of the first reflective surface on the effective region side in a direction along the emission surface, and
   a border portion between the first reflective surface and the second reflective surface is formed in an R-shape.

4. The planar illumination apparatus according to claim 1, wherein
   the reflective surface includes a third reflective surface that extends from an end portion of the first reflective surface beside the light blocking region in a direction along the emission surface, and
   the third reflective surface is connected to the light source by a connecting member from a side opposite to the emission surface side.

5. The planar illumination apparatus according to claim 4, wherein a border portion between the first reflective surface and the third reflective surface is formed in an R-shape.

6. The planar illumination apparatus according to claim 4, wherein an optical path change pattern is provided on the third reflective surface of the light guide plate.

7. The planar illumination apparatus according to claim 4, wherein the third reflective surface of the light guide plate extends to the effective region.

8. The planar illumination apparatus according to claim 1, wherein an optical path change pattern is provided on the emission surface of the light guide plate.

9. The planar illumination apparatus according to claim 8, wherein an optical path change pattern is provided on the third reflective surface of the light guide plate.

10. The planar illumination apparatus according to claim 8, wherein the third reflective surface of the light guide plate extends to the effective region.

11. The planar illumination apparatus according to claim 1, further comprising:
    a container that houses the light source and the light guide plate, wherein
    a portion of a bottom surface of the container facing the first reflective surface is inclined toward the emission surface side.

12. The planar illumination apparatus according to claim 1, further comprising:
    a container that houses the light source and the light guide plate, and includes a bottom surface oriented along the emission surface;
    a touch sensor that is arranged on the bottom surface of the container, and detects a change in capacitance due to a touch operation performed by a user; and
    a buffer member that is arranged on a surface of the touch sensor on the light emission surface side, and prevents a contact between the light guide plate and the touch sensor, wherein
    a distance between the buffer member and the light guide plate increases from the light blocking region toward the effective region.

* * * * *